United States Patent [19]

Sadler

[11] 4,326,891
[45] Apr. 27, 1982

[54] CRYSTALLINE CALCIUM CARBONATE AS A DILUENT IN HYDROTHERMALLY CURED HYDRAULIC CEMENT COMPOSITIONS

[75] Inventor: Thomas H. Sadler, Littleton, Colo.

[73] Assignee: Manville Service Corporation, Denver, Colo.

[21] Appl. No.: 151,856

[22] Filed: May 21, 1980

[51] Int. Cl.³ .............................................. C04B 7/02
[52] U.S. Cl. ...................................... 106/99; 106/120
[58] Field of Search ...................... 106/97, 98, 99, 120

[56] References Cited

U.S. PATENT DOCUMENTS

| | | | |
|---|---|---|---|
| 662,643 | 11/1900 | Griswold | 106/99 |
| 1,861,317 | 5/1932 | Moross | 106/98 |
| 2,602,754 | 7/1952 | Abraham | 106/120 |
| 3,366,720 | 1/1968 | Burger | 106/98 |
| 3,501,323 | 3/1970 | Moorehead | 106/120 |
| 3,582,377 | 6/1971 | Hays et al. | 106/97 |

*Primary Examiner*—James Poer
*Attorney, Agent, or Firm*—Robert M. Krone; Joseph J. Kelly; Gregory W. O'Connor

[57] ABSTRACT

The present invention relates to hydrothermally cured articles of manufacture and the processes for making the same. In the past, calcium carbonate has been included in such articles and processes a number inert filler materials to alter physical characteristics, appearance, etc. The present invention comprises incorporating crystalline calcium carbonate, preferably in the form of powdered marble, with the normal constituents to dilute the relative amounts of these constituents and thus make a more economic blend without substantial degradation to the physical characteristics of the article of manufacture incorporating such crystalline calcium carbonate.

10 Claims, 5 Drawing Figures

CRYSTALLINE CALCIUM CARBONATE AS A DILUENT IN HYDROTHERMALLY CURED HYDRAULIC CEMENT COMPOSITIONS

TECHNICAL FIELD

The present invention relates to the field of hydrothermally cured hydraulic cement compositions and in particular methods of manufacturing articles comprising hydraulic cement, ground quartz and inorganic fiber. More particularly, the present invention involves the use of a specific form of calcium carbonate, specifically calcium carbonate having a predominantly crystalline structure, as a structural addendum or diluent to compositions comprising substantially these three constituents. In the processing of such hydraulic cementitious compositions, the ingredients thereof are combined and cured under elevated steamed pressures and temperatures to bring about a reacted cured product having superior strength and chemical resistance characteristics.

BACKGROUND OF THE PRIOR ART

Calcium carbonate, usually in the form of a powder derived from naturally occuring mineral deposits, e.g., limestone, dolomite, or marble, have been in the past employed in various functions in combination with certain binders and other materials to form articles of manufacture.

For example, U.S. Pat. No. 3,366,720 suggests producing building blocks by dry mixing 1 to 15 parts by volume of a rock selected from a group consisting of granite, quartz, feldspar, limestone, slate, marble, porphyry, sandstone, syenite, basalt, diabase, trachyte, dolomite, and gneiss with one part hydraulic cement and a small amount of calcium chloride, compressing these materials under high pressure and curing the thus formed block with steam under pressure. These base materials are characterized as particles of rock "of hard type".

In U.S. Pat. No. 3,231,657, an insulating material of the calcium silicate type is formed by molding in mold halves a slurry of lime, silica and water. Thus molded, the articles are cured under pressurized, saturated steam conditions for a time period from 1 to up to 15 hours. To these basic ingredients (quick lime, silica, and water) may be added to other ingredients in minor amounts. Example 1 shows asbestos, clay and "inerts, e.g., limestone, etc." are added. The function of these fillers and inert materials are not directly stated.

In another process set forth in U.S. Pat. No. 2,602,754 magnesium sulphate and pressure hydrated dolomite is added to the slurry to impart the feel and softness simulating that of well known 85% magnesia insulation.

Calcium carbonate in the form of limestone and marble has also been used in non-autoclave cured compositions. One example of this is shown in U.S. Pat. No. 662,643 wherein plaster of paris, hydraulic cement and ground or pulverized shale and limestone or marble are combined and used for a wall plaster on lathing. A quantity of "any of the ordinary fibers" may be incorporated, such as wood fiber.

Another example is shown in U.S. Pat. No. 1,861,317 which discloses a cement sizing between stucco, masonry, and plaster surfaces and an outer coating of oil paint or similar surface preparation. This sizing consists of a hydraulic cement such as Portland Cement, a filler of an amorphous white silica, pulverized quartz or silex, chalk, pulverized limestone, or marble or other silicious or calcareous material(s). Materials are combined with a suitable quantity of alum which is intended to react with the calcium carbonate containing materials to form calcium sulphate and aluminum hydroxide. Other materials such as casein compound, borax and hydrated lime are further included.

BRIEF SUMMARY OF THE INVENTION

Applicant's invention includes an improved process for making autoclaved cementitious articles of manufacture. The process includes the steps of combining a hydraulic cement, a reactive ground quartz and an inorganic fiber reinforcement and a calcium carbonate. The improvement comprises selecting from the family of calcium carbonates a form of calcium carbonate having a well defined, highy compacted, structurally sound, crystalline structure which has at most a minor amount of carbonates having an amorphous structure.

Preferably the calcium carbonate having a well defined crystalline structure is derived from a ground marble. This ground marble can have an average particle size ranging from 0.2 microns to as large as 200 microns, but preferably has an average equivalent spherical diameter of between 10 and 50 microns and a standard particle size distribution extending to both finer and coarser materials on both sides of this average or mean diameter range.

Applicant's invention also includes an article of manufacture comprising essentially a hydraulic cement binder, a reactive ground quartz and a quantity of inorganic fiber reinforcements together with a ground calcium carbonate constituent having being chosen from the family of calcium carbonates, the chosen calcium carbonate having a well defined highly compacted, structurally sound crystalline structure, but having at most a minor amount of carbonates with amorphous structure.

Preferably the hydraulic cement is a Portland cement and the above described carbonate incorporated therein is a powdered marble having an average particle size ranging from 0.2 microns to as much about 200 microns in average diameter but preferably having an average equivalent spherical diameter of between about 10 to about 50 microns with standard particle size distribution about this average diameter range. Preferably the fiber reinforcement is an asbestos fiber.

DETAILED DESCRIPTION OF THE INVENTION

Figure 1:
FIG. 1 is a photomicrograph of a highly crystalline calcium carbonate.

It has been known for many years that it is desirable to incorporate in cementitious compositions aggregate materials which are themselves of structurally durable composition. For example, it has been found desirable to incorporate in such compositions the silica in the form of a crushed quartz, for example, in order to take advantage of the greater mechanical strength of this particular crystalline form as compared to the incorporation of other silica bearing materials, for example, diatomaceous earth. While each form of silicious material may satisfy the stoichiometric requirements of the hydrothermal reaction, the crushed crystalline quartz would in general result in a structurally superior product compared to that made with a non-crystalline, (amorphous) type silica.

The selection of the proper calcium carbonates in accordance with the present invention can be aided by the following analogy. Carbon can take at least three forms, diamond, pure carbon black and graphite. These three structural forms of carbon are identical chemically. These differing structural forms result in radically contrasting physical aspects. Diamond, of course, is a highly structured, compacted, structurally sound form of carbon being very hard and having superior physical durability when compared to either carbon black or graphite. Graphite, while it does have a crystalline structure, cannot be considered to have superior hardness or physical durability when compared to diamond. Its crystalline structure is less compacted and certainly does not impart a high degree of structural soundness when compared to the diamond. Carbon black can be described as essentially amorphous, i.e., having no appreciable crystalline structure, consequently, the structural integrity of carbon black is minimal, certainly in comparison to the highly compacted, structurally sound crystalline diamond form of carbon as mentioned above.

Calcium carbonate similarly occurs in a number of forms ranging from a truly amorphous structure typified by some types of limestone and specifically a precipitated calcium carbonate, to a highy crystalline form of calcium carbonate typified by marble, a metamorphic rock. Other crystalline or semi-crystalline forms of calcium carbonate, specifically some sorts of stone, have a crystalline structure, although this crystalline structure cannot be termed a highly compacted, structurally sound crystalline form of calcium carbonate. Examples of such would be the fibrous or lamellar kinds, such as satinspar or lublinite, granular limestone or sakaroidal limestone which have a texture varying from very coarse to very fine granular form, chalk, a white greyish white or yellowish soft mineral composed of the decomposed shells of minute sea organisms. Oolite, while not totally amorphous, fails to have a true crystalline structure since its arrangement consists of grains or minute concretions looking somewhat like the roe of fish.

Accordingly, it is desirable to select calcium carbonates having a highly compacted, structurally sound crystalline structure most highly typified by the metamorphic or semi-metamorphic mineral deposits typified by marble. This does not mean that all other mineral forms of calcium carbonate or artificially generated calcium carbonate would fail to meet the requirements of the instant invention. Some limestone deposits, as acknowledged above, may consist of a substantial amount of calcium carbonate in a highly compacted, structurally sound crystalline form. However, Applicant has found it most desirable to use crushed or powdered marble since it has been found that such deposits contain only a minimum amount of calcium carbonate in amorphous or structurally unsound forms. Also, the calcium carbonate selected in accordance with the instant invention may have relatively small amounts of other carbonates, such as magnesium carbonate, but not so much of such other metal carbonates so as to destroy the desired crystalline structure.

Figure 3:
FIG. 3 is a photomicrograph of a portion of FIG. 1 enlarged to a much greater scale.

The importance of selecting a calcium carbonate for Applicant's invention which has a well defined, highly compacted, structurally sound crystalline structure will perhaps be more apparent on viewing FIG. 1. In particular the calcium carbonate shown in FIG. 1 is an artificial form and is shown magnified 500 times by a scanning electron microscope. As can be seen, the predominant shape of the crystals is rhambohedral which characterizes the crystalline forms of the calcite group of naturally occuring minerals. The crystals are easily fractured along their faces leaving relatively clean surfaces. The importance of this aspect of the crystalline calcium carbonate will be set forth in more detail below. FIG. 3 is a greatly enlarged portion of the photomicrograph of FIG. 1 and shows more clearly using a 2,000 ×magnification the predominant crystalline structure.

Figure 2:
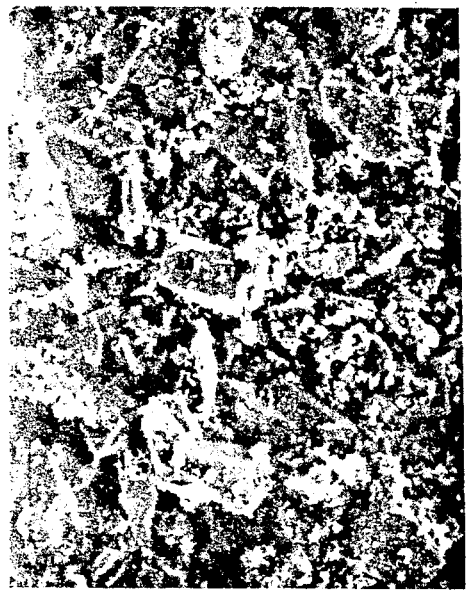
FIG. 2 is a photomicrograph of a naturally occuring form of calcium carbonate of the type selected in the present invention having a well defined crystalline structure.

FIG. 2 shows a form of crystalline calcium carbonate from a naturally occuring deposit of marble. The magnification of FIG. 2 is the same as in FIG. 1. Despite its natural source, the overall characteristic of the material shown in FIG. 2 is also crystalline. However, a certain portion seems to be an amorphous condition. This is shown more clearly in FIG. 4 wherein a fairly large fractured crystal of marble is shown peppered with small particles of what appears to be an amorphous calcium carbonate.

Figure 5:
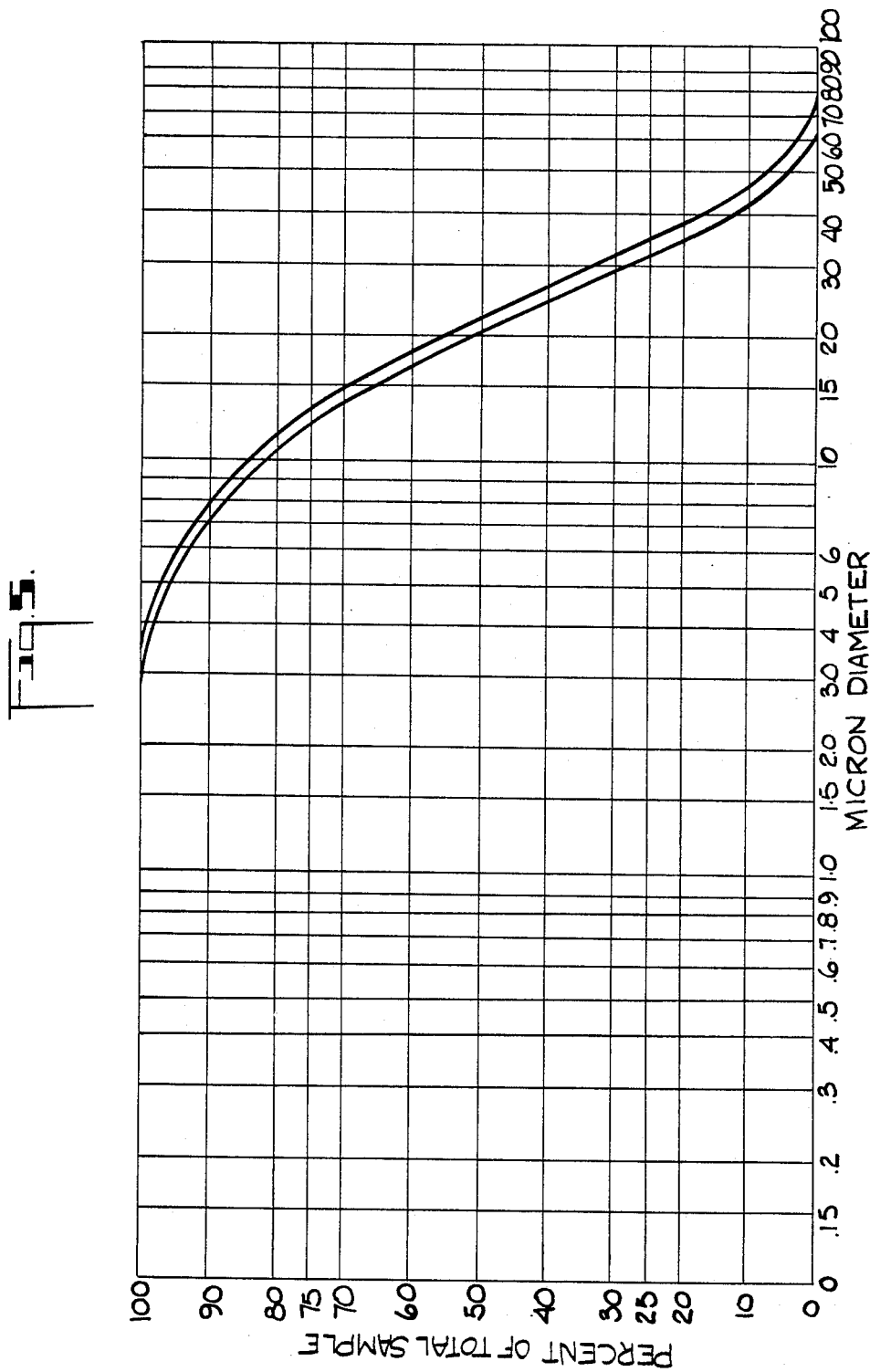
FIG. 5 is a graph showing the particle distribution size of a preferred form of the crystalline calcium carbonate in accordance with the present invention.

The size of the particles that Applicant uses to combine with other ingredients in accordance with his invention is represented in FIG. 5. FIG. 5 is the graphical output of a Coulter Counter, an instrument of a standard form known in the art for determining the population of various particle sizes and a material sample. The average particle size or equivalent spherical diameter for this particular sample is shown to be about 22 microns with 10% of the particulate material having diameter of about 7 microns or less and another 10% of the material having a diameter of 44 microns or more. Applicant has found that while the average equivalent spherical diameter of the crystalline calcium carbonate particles should be between about 10 and about 50 microns, this size can range from as little as 0.2 microns to as large as 200 microns in average size. The particular distribution of sizes around this average can be the classic particle size distribution curve as shown in FIG. 5, although variations from this particle size distribution can be tolerated.

In incorporating the crystalline carbonate as set forth above into a cementitious position, Applicant has found it best to use such crystalline calcium carbonate as a diluting agent. That is, for a given amount of crystalline calcium carbonate added to the mix, each of the main ingredients, cement, quartz flour and inorganic fibrous reinforcement, specifically asbestos fiber, are reduced proportionately. For example, using, e.g., 15% asbestos, 50% Portland Cement and 35% quartz flour as control, several compositions were tried as set forth in the following table.

TABLE I

| Blend | Composition (Expressed in % of Total Blend) ||||  Hydrostatic Strengths (Expressed in % of Control for that Day) |||||
| --- | --- | --- | --- | --- | --- | --- | --- | --- | --- |
|  | Crystalline Calcium Carbonate | Asbestos Fiber | Portland Cement | Quartz Flour | 1 | 2 | 3 | 4 | 5 |
| Control | 0 | 15 | 50 | 35 | 100 | 100 | 100 | 100 | 100 |
| 10 | 9.1 | 13.6 | 45.5 | 31.8 | 108 | 99 | 99 | 98 | — |
| 15 | 13.0 | 13.0 | 43.5 | 30.5 | 107 | 99 | 92 | 105 | 101 |
| 20 | 16.7 | 12.5 | 41.7 | 29.1 | 100 | 98 | 84 | 98 | 95 |

The experimental compositions included respectively 9.1, 13 and 16.7% by weight of marble dust approximating the materials shown in FIGS. 2, 3, and having a particle distribution as shown in FIG. 5. As can be seen from the 3rd, 4th and 5th columns each of the percentages of the three main constituents (fiber, Portland Cement and ground quartz) were each reduced proportionately. In the control as well as experimental blends, materials and were formed into short sections of pipe using standard wet forming techniques and were processed substantially in accordance with U.S. Pat. No. 3,634,567. The hydrostatic strengths were determined by standard testing procedures. The hydrostatic strengths were based on the percent of the hydrostatic strength for the control pipe made with the control blend on that date.

The hydrostatic strength varied from 84% of control to 108% of control, with the hydrostatic strengths of the 13% marble flour experimental blend being substantially the same as the undiluted control blend. Even with 16.7% of the total composition comprising the marble dust, hydrostatic strengths were reduced at most only 16%.

The test results differed considerably from that which would be expected when an otherwise inert "filler" (such as previous uses of calcium carbonate in general have been considered), is included in such large amounts in the overall blend. These results are quite striking when one considers the effect of adding what would normally be considered a "filler", generally acting as an inert material to the reaction taking place between the Portland Cement and silica components.

While the scope of the invention should not be limited to the theory concerning the activity of the crystalline calcium carbonate component in these blends, such theory may aid in understanding the invention. It is suspected that during autoclaving the clean surfaces or cleavages of the crystalline calcium carbonate crystals provide cites for hydrothermally generated secondary and perhaps tertiary calcium silicate crystalline growth. Nucleating cites on amorphous calcium carbonate, while perhaps resulting in the silicate growth, would not act as firm anchors for these crystals and thus the binding function that the silicate crystals could otherwise provide would tend to be lost. In contrast, secondary and tertiary silicate crystals attached firmly to the clean, well defined surfaces of the crystalline particles would permit the crystalline particle to form just one of the series of structural links in the crytalline matrix formed by these secondary and tertiary silicate formations. Also the particular crystalline structure made available in large quantities by the use of powdered marble may permit packing of these particles within the fiber/silica/silicate crystal structure of the cementitious composition. This packing theory approach to the benefits of the crystalline calcium carbonate addition is less well refined since further experiments must be performed using carbonates of different particle sizes to determine optimum size for varying the density of the overall structure and the effect of this varying density on ultimate strengths such as hydrostatic strength.

In tests, Applicant has determined that preferably about 6.7% to about 10% of the total blend by weight should be comprised of crystalline calcium carbonate, specifically marble dust. About 6.7% is especially desirable for asbestos cement pressure pipe made by this formulation. The various tests on pressure pipe made according to the instant invention show no significant difference between such pressure pipe made with about 6.7% crystalline calcium carbonate versus the pressure pipe made according to the prior art. Other asbestos cement products such as sewer pipe could be made with between 6.7 and 10% of crystalline calcium carbonate without substantially adversely affecting the ultimate flex strength of the pipe. Crush strength however may be slightly adversely affected.

Figure 4:
FIG. 4 is a photomicrograph of a portion of FIG. 2 enlarged to a much greater scale.

It should be understood, of course, that in making certain articles of manufacture where such rigorous ultimate strengths are not required, higher percentages of crystalline calcium carbonate may be incorporated. For example, hydrothermally cured sheet goods, such as flat and corrugated asbestos cement sheets, can take advantage of the use of crystalline calcium carbonate to reduce the overall blend cost yet not substantially adversely affect the usability of such sheet materials. For example, such materials could include up to 20% by weight crystalline calcium carbonate without undue adverse effects, when such sheet materials are hydrothermally cured to take advantage of the suspected secondary and tertiary silicate crystal growth on the cleanly fractured crystalline surfaces. It should be further understood that while Applicant's preferred example is marble dust as the source of the crystalline calcium carbonate diluting agent, other forms of crystalline calcium carbonate could be used. While the exact yard stick used to determined what is the correct form of a crystalline calcium carbonate has yet to be determined, the samples shown in the microphotographs of FIGS. 1, 2, 3 and 4 can be used to typify the appropriate material. As shown in FIGS. 3 and 4 some amount of amorphous calcium carbonate, as well as minor amounts of other contaminants can be tolerated. Generally, appropriate materials can be typified as having a well defined, highly compacted, structurally sound crystalline structure as opposed to an amorphous or nodular structure—thus distinguishing Applicant's invention from any prior use of generic limestone, chalk, etc. as an inert filler in hydrothermally cured cementitious compositions.

I claim:

1. In a hydrothermally cured article of manufacture comprising a blend of calcium carbonate, inorganic reinforcing fiber, hydraulic cement and ground quartz, the improvement comprising said calcium carbonate being a powdered crystalline calcium carbonate having a well-defined, highly compacted, structurally sound, crystalline structure and having at most a minor amount of carbonates with an amorphous structure and wherein the average equivalent spherical diameter of the particles of the crystalline calcium carbonate is between about 10 and 50 microns.

2. An article of manufacture according to claim 1 wherein said crystalline calcium carbonate is powdered marble.

3. An article of manufacture as set forth in claim 1 wherein said inorganic reinforcing fiber is asbestos fiber.

4. An article of manufacture as set forth in claim 3 wherein said article of manufacture is a pipe.

5. An article of manufacture as set forth in claim 1 wherein crystalline calcium carbonate comprises between about 6.7% to about 20% by weight of the total blend.

6. In a process for making a hydrothermally cured article of manufacture including the steps of combining a hydraulic cement, ground quartz, inorganic reinforcing fiber and calcium carbonate and hydrothermally curing the combined ingredients, the improvement comprising selecting from the family of calcium carbonates a powdered calcium carbonate having a well-defined, highly compacted, structurally sound crystalline structure and having at most a minor amount of amorphous carbonates and wherein the average equivalent spherical diameter of the particles of said selected calcium carbonate is between about 10 and 50 microns.

7. A process as set forth in claim 6 wherein the calcium carbonate selected is powdered marble.

8. A process as set forth in claim 6 wherein said inorganic fiber reinforcement is asbestos fiber.

9. A process as set forth in claim 8 further including the step of shaping the combined ingredients to form a pipe.

10. A process as set forth in claim 6 wherein the crystalline calcium carbonate comprises between 6.7% and 20% by weight of the combined ingredients.

* * * * *